United States Patent
Scherzinger et al.

(10) Patent No.: US 6,730,232 B2
(45) Date of Patent: May 4, 2004

(54) PROCESS AND DEVICE FOR SEPARATING IMPURITIES FROM A SUSPENSION BY FLOTATION

(75) Inventors: Bernhard Scherzinger, Graz (AT); Helmuth Gabl, Graz (AT)

(73) Assignee: Andritz AG, Graz (AU)

( * ) Notice: Subject to any disclaimer, the term of this patent is extended or adjusted under 35 U.S.C. 154(b) by 0 days.

(21) Appl. No.: 10/244,886

(22) Filed: Sep. 17, 2002

(65) Prior Publication Data

US 2003/0070992 A1 Apr. 17, 2003

(30) Foreign Application Priority Data

Sep. 17, 2001 (AT) .......................................... 1457/2001

(51) Int. Cl.$^7$ ................................................. C02F 1/24
(52) U.S. Cl. .................... 210/703; 210/221.2; 251/121; 251/122
(58) Field of Search .............................. 210/703, 221.2; 251/121, 122

(56) References Cited

U.S. PATENT DOCUMENTS

| | | | | |
|---|---|---|---|---|
| 3,175,687 A | * | 3/1965 | Jones | |
| 3,799,350 A | * | 3/1974 | Savall et al. | |
| 3,809,240 A | * | 5/1974 | Savall | |
| 3,820,659 A | * | 6/1974 | Parlette | |
| 3,932,282 A | * | 1/1976 | Ettelt | |
| 3,966,598 A | * | 6/1976 | Ettelt | |
| 4,337,788 A | * | 7/1982 | Seger | |
| 4,413,646 A | * | 11/1983 | Platt et al. | |
| 4,503,878 A | * | 3/1985 | Taylor | |
| 4,707,278 A | * | 11/1987 | Breyer et al. | |
| 5,154,351 A | * | 10/1992 | Takko | |
| 5,368,273 A | * | 11/1994 | Dante | |
| 5,967,164 A | * | 10/1999 | Denda et al. | |

* cited by examiner

Primary Examiner—Thomas M. Lithgow
(74) Attorney, Agent, or Firm—Alix, Yale & Ristas, LLP

(57) ABSTRACT

Apparatus and a process for separating impurities from a suspension in a flotation cell, including an aeration device for aerating a liquid with a gas until the liquid is saturated. An expansion device expands the liquid saturated with gas to form gas bubbles in the liquid. An addition device adds the liquid containing gas bubbles to the suspension in the flotation cell.

11 Claims, 4 Drawing Sheets

PROCESS AND DEVICE FOR SEPARATING IMPURITIES FROM A SUSPENSION BY FLOTATION

BACKGROUND OF THE INVENTION

The invention relates to a process for separating impurities from a suspension by flotation, covering aeration of a liquid with gas until it is saturated, followed by expansion of the liquid saturated with gas, during which gas bubbles form, as well as a device for separating impurities from a suspension by flotation, covering at least devices for aerating a liquid with gas until the liquid is saturated, for then expanding the liquid saturated with gas, during which gas bubbles form, and for adding the liquid with gas bubbles to the suspension and feeding it to a flotation cell, as well as a device for generating gas bubbles in a liquid saturated with gas.

Froth flotation is a physical process for removing impurities from suspensions. This process requires gas bubbles to be generated in a suitable quantity and size distribution. Hydrophobic or waterproofed substances are carried to the surface of the liquid by the gas bubbles adhering to them and can be removed there together with the froth. Processes of this kind are known, for example, from DE 41 16 916 C2, and have reached a high technical standard. Self-priming injectors are often used to generate the gas bubbles and mix them into the suspension. Here, the flow of suspension charged with impurities exiting from a nozzle generates negative pressure and sucks in gas, which is mixed with the suspension as a result of the pulse exchange between gas and liquid. A device of this type is described, for example, in DE 34 12 431 A1.

The DE 198 45 536 describes a de-inking process where flotation bubbles are formed in a suspension saturated with gas and subsequent expansion, where sticking fibers are separated in a following step. In this process pressures of 0.6 to 1.2, bars are used and the size of the created bubbles can hardly be regulated.

A process is also known in which pressurized water, saturated with gas, is injected into a flotation cell in order to thus cause gas bubbles to form. WO 90/10502 A1 describes a nozzle provided for this purpose, where the flow passages and directions can be modified, allowing the nozzle to be cleaned easily.

SUMMARY OF THE INVENTION

The aim of the present invention was to provide a flotation process and devices for use therein, which offer improved conditions for setting the optimum size and quantity of bubbles in the suspension and thus, make the process more effective.

In order to achieve this aim, the invention provides for the liquid saturated with gas expanding separately and before the liquid containing the gas bubbles is added to the suspension with the impurities, as part of the process described above. Thus, formation of gas bubbles can be uncoupled from feed into the flotation cell and the conditions prevailing there, and can be optimized independently thereof.

A further improvement can be achieved in an advantageous configuration of this process if the liquid is also expanded separately after it has been aerated with gas.

In a tried-and-tested method, the liquid can expand by injecting the liquid saturated with gas.

According to a further feature of the invention, it is advantageous if the liquid is expanded by a propulsion jet of the liquid saturated with gas being sprayed into an enclosed space, where the stream diverges. In this way, the pressure differential needed to release the gas bubbles can be generated easily, but still very effectively.

In order to achieve the aim of the present invention, the plant for removing impurities from suspensions with the aid of flotation is also characterized according to the invention by the device for expansion of the liquid being arranged separately from the device for adding the liquid with gas bubbles to the suspension and separately from the flotation cell.

In order to provide an easy method of adjusting the pressure loss during expansion and thus optimise generating of the gas bubbles for the application in question, as well as optimise the given or desired conditions, a further feature of the invention provides for a nozzle with adjustable cross-section, preferably also an adjustable cross-section area. A device of this type can be used in all flotation plants and cells, even if the liquid containing the gas bubbles, particularly the suspension itself, is injected directly into the flotation cell.

It is an advantage here if the nozzle has an annular opening, according to a preferred configuration.

A particularly good flow characteristic and spreading of the liquid jet exiting from the nozzle is obtained in a configuration where the outer limit of the nozzle has the shape of a Laval nozzle.

It is also an advantage if the nozzle with annular opening has a central section formed by a cone converging into the enclosed area, which contributes to the favourable flow characteristics after discharge of the liquid jet.

If, according to a further feature of the invention, the cone can be moved in axial direction and/or rotated round its own axis, the cross-section area of the opening can be modified easily and thus, the pressure loss obtainable can be set and the propulsion jet nozzle can be cleaned or flushed out in the event of clogging.

In addition, by improving the flow characteristics, optimum gas bubble formation is assisted by the device being designed such that the enclosed area is formed by a pulse pipe with a largely constant cross-section and, preferably, an adjoining diffuser whose cross-section increases from the nozzle outwards.

BRIEF DESCRIPTION OF THE DRAWINGS

The present invention may be better understood and its numerous objects and advantages will become apparent to those skilled in the art by reference to the accompanying drawings in which.

DETAILED DESCRIPTION OF THE PREFERRED EMBODIMENT

Figure 1:
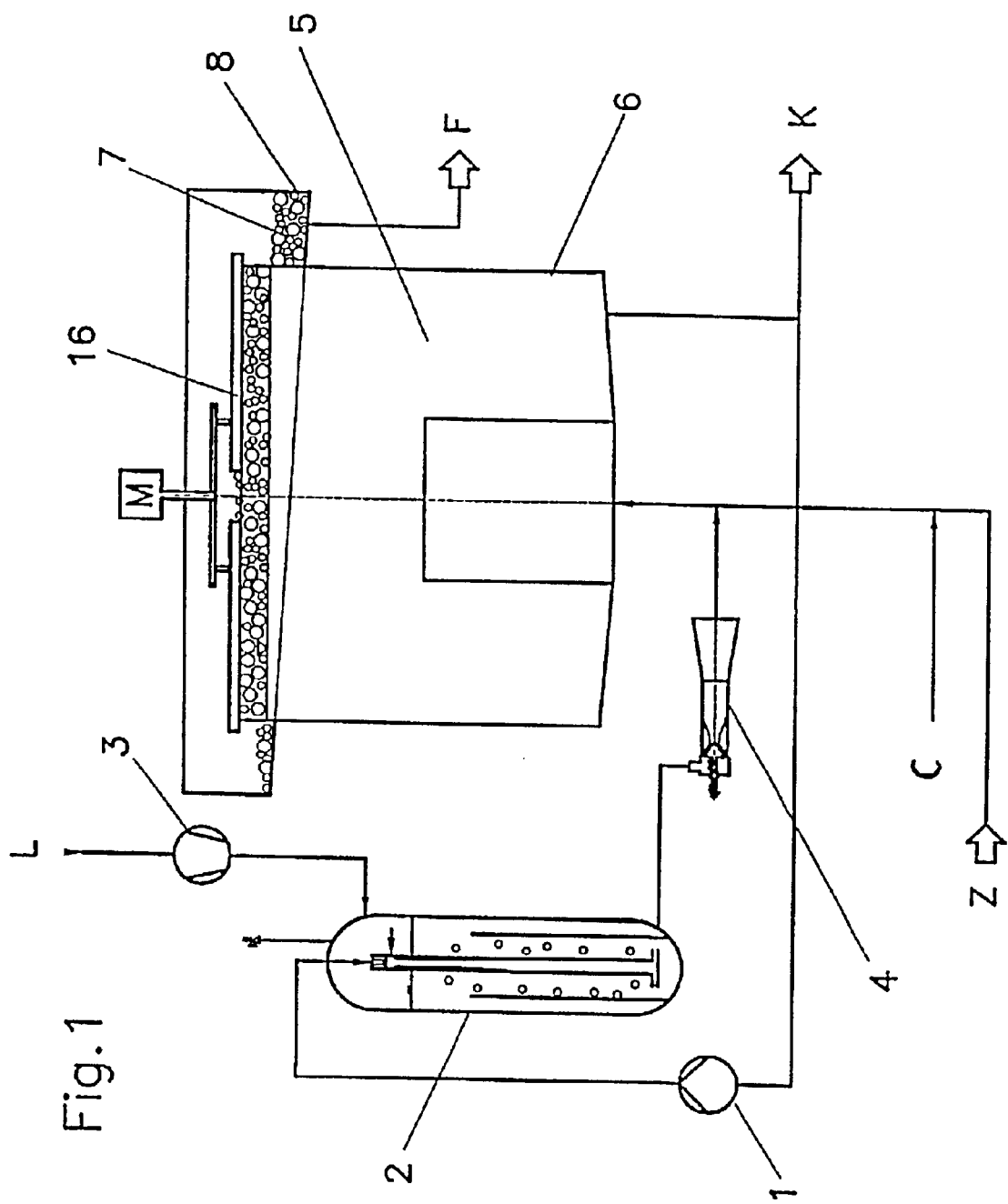
FIG. 1 is a diagrammatic view of a flotation plant according to the invention.

FIG. 1 provides a diagrammatic view of a flotation plant with a device for expanding the liquid previously saturated with gas, according to the invention, in the form of a bubble injector 4, where, in this device, the gas bubbles required for the flotation process are made to form in the liquid. The flotation cell 6 itself is largely filled with a suspension 5 on whose surface a froth 7 comprising the gas bubbles forms and which contains as much as possible of the solids particles to be removed by flotation. This froth is brought to the froth channel 8 by a skimmer 16 and can drain off as flotate F.

Part of the clarified water K from the recycling stream is increased to the desired saturation pressure between 3 and 10 bar using the booster pump 1 and fed to a saturation tank 2. Air L from the surrounding area is compressed to the required saturation pressure by a compressor 3, after which it is also fed to the saturation tank 2 and dissolved in the liquid by means of intensive mass transfer. The hydraulic fluid at a pressure increased to saturation point then enters the bubble injector 4, specially designed to generate very fine bubbles, to reduce the pressure again and is fed, together with the feed flow Z containing solids and possibly with flotation agents C added, to the flotation cell 6, where the flotation process takes place. The bubbles that have formed as a result of pressure expansion adhere to hydrophobic solids and carry them to the surface. The suspension that has been cleaned by flotation leaves the flotation cell as clarified water K.

Figure 2:
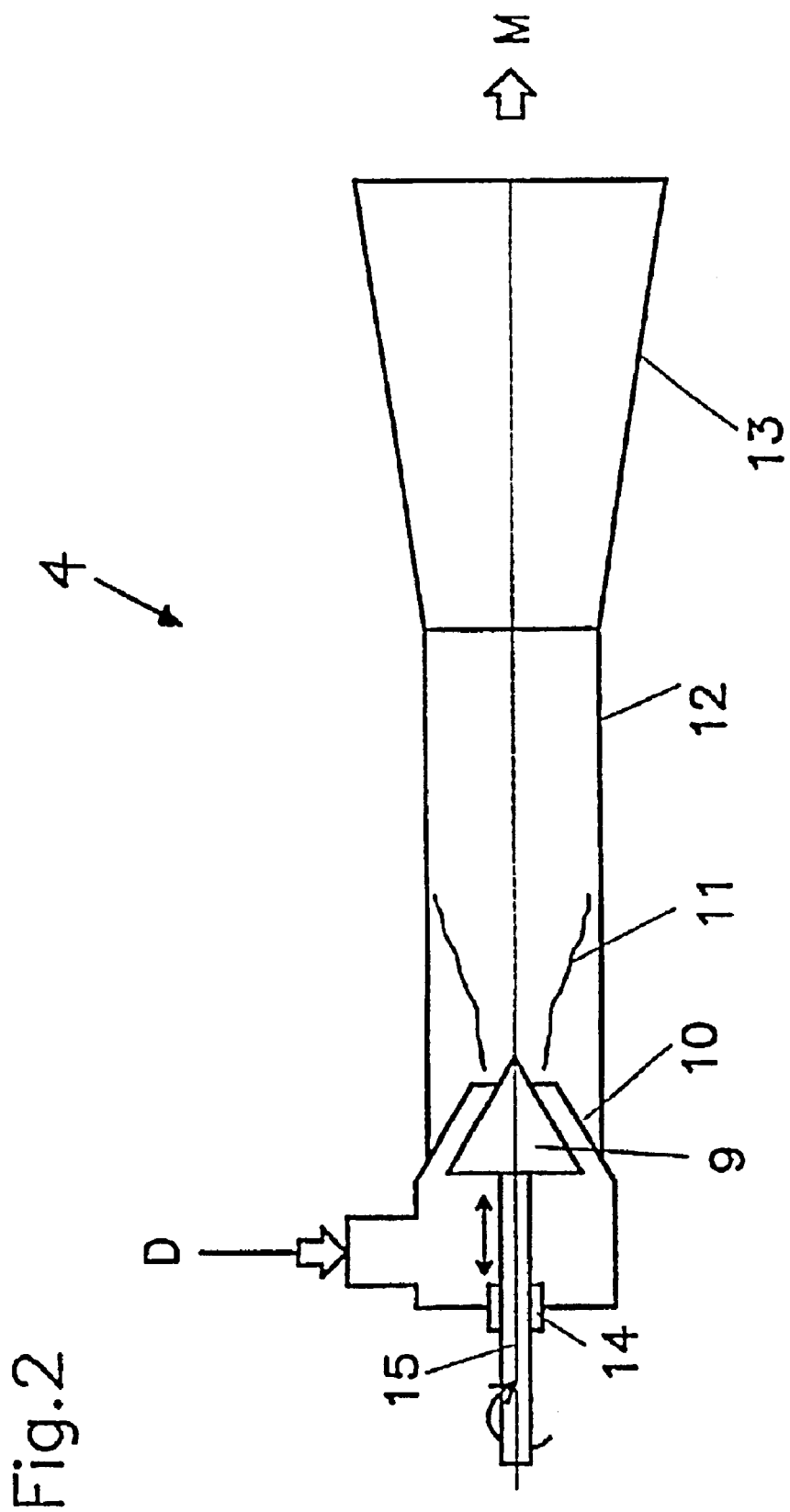
FIG. 2 is a diagrammatic view of a first embodiment of a bubble injector for use in the plant of FIG. 1.

FIG. 2 shows the device 4 according to the invention for pressure reduction and generating very fine gas bubbles. The hydraulic fluid D from the saturation tank and at a pressure increased to saturation point enters the bubble injector 4 ahead of the propulsion jet nozzle 10. The necessary pressure reduction in the propulsion jet nozzle 10 can be set by changing the annular gap cross-section between the inner edge of the propulsion jet nozzle 10 and the cone 9 with central, co-axial mounting. In order to do this, the cone 9 can be pushed in axial direction towards the propulsion jet nozzle 10 or away from it. This should be effected preferably by turning the cone 9 mounted on a threaded rod 15, which is pivoted in the thread 14. Due to this rotating movement, additional force is also applied to any solids particles or flocs that may be present, and this has a cleaning effect on the propulsion jet nozzle 10. The liquid flow leaving the propulsion jet nozzle 10, and which has expanded abruptly, generates a vacuum due to being spread out as an open jet 11 in the pulse pipe 12, thus causing more and, in particular, finer bubbles to form. The micro-bubble dispersion M leaves the bubble injector 4 after passing through a diffuser 13 that follows the pulse pipe 12. Optimum gas bubble formation is assisted by the pulse pipe 12 having a largely constant cross-section and, preferably, the adjoining diffuser 13 having a cross-section that increases in the direction of flow.

Figure 3:
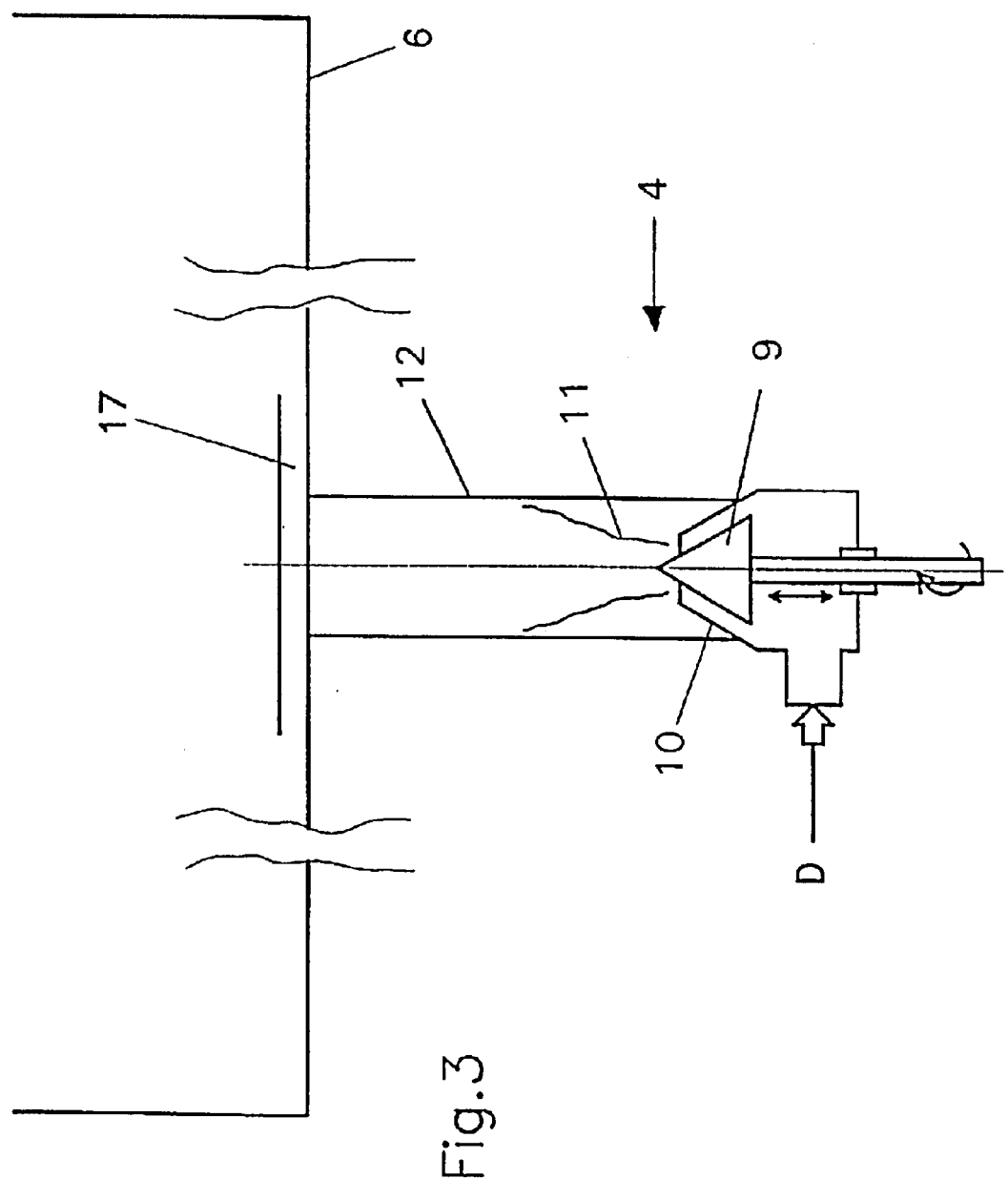
FIG. 3 is a diagrammatic view of a second embodiment of a bubble injector in combination with a radial diffuser.

As shown in FIG. 3, the device 4 according to the invention is located immediately upstream of the flotation cell 6. Here, a radial diffuser 17 is provided in this flotation cell 6 for improved distribution of the bubble dispersion immediately behind the pulse pipe 12 of the bubble injector 4, where the pulse pipe 12 is preferably mounted on the flotation cell 6.

Figure 4:
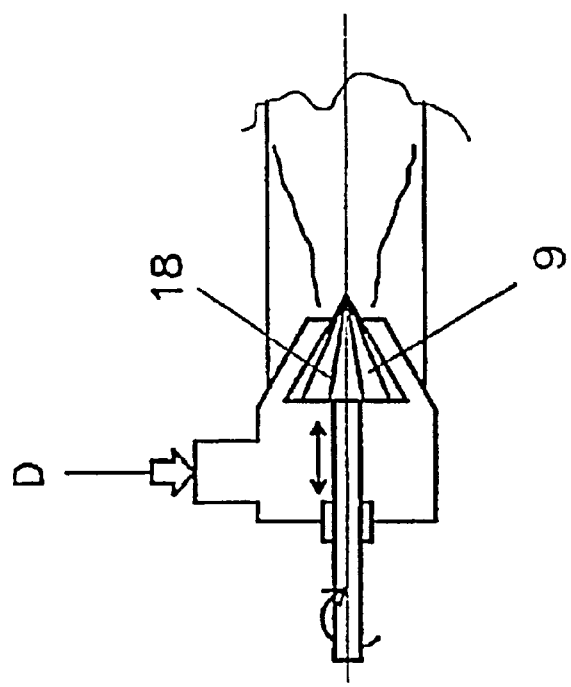
FIG. 4 is a diagrammatic view of the beginning of a bubble injector according to the invention, with specially shaped central cone.

At the bubble injector 4 in FIG. 4, the central cone 9 for setting the size of the annular gap of the propulsion jet nozzle 10 by means of its axial movement is provided with additional fine grooves 18. Thus, the cleaning effect obtained by turning the cone 9 can be improved even further.

Figure 5:
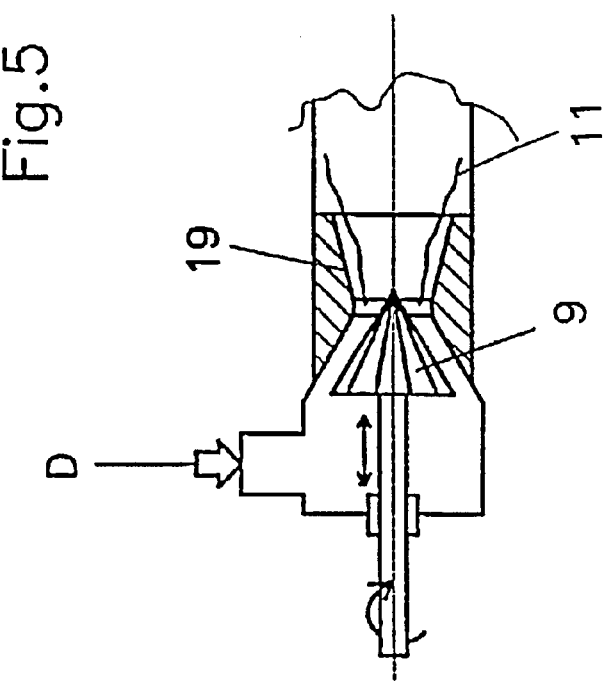
FIG. 5 is a diagrammatic view according to FIG. 4, but with a Laval-shaped propulsion jet nozzle.

The design of bubble injector 4 shown in FIG. 5 has a propulsion jet nozzle 19 of Laval design shape, which is used for better spread of the liquid jet 11 with complicated (e.g. fibrous) media, effecting a considerable increase in the vacuum that can be generated in these media as well and thus, leading to formation of finer gas bubbles.

What is claimed is:

1. A process for separating impurities from a suspension by flotation, the process comprising the steps of:
   aerating a liquid with a gas until the liquid is saturated with the gas;
   expanding the liquid saturated with gas to form gas bubbles by spraying a propulsion jet of the liquid saturated with gas into an enclosed space whereby the stream diverges; and
   adding the liquid containing gas bubbles to the suspension;
   wherein the liquid saturated with gas is expanded separately from and before the liquid containing the gas bubbles is added to the suspension.

2. The process of claim 1 wherein the liquid is expanded separately from and after the liquid has been aerated with the gas.

3. The process of claim 1 further comprising the step of pressurizing the liquid saturated with gas to a pressure of 3 to 10 bars before the step of expanding.

4. An apparatus for separating impurities from a suspension in a flotation cell, the apparatus comprising:
   an aeration device adapted for aerating a liquid with a gas until the liquid is saturated;
   an expansion device adapted for expanding the liquid saturated with gas to form gas bubbles in the liquid, the expansion device including a jet spraying the liquid saturated with gas into an enclosed space; and
   an addition device adapted for adding the liquid containing gas bubbles to the suspension in the flotation cell;
   wherein the expansion device is separate from the addition device and separate from the flotation cell.

5. An apparatus for generating gas bubbles in a flowing liquid saturated with gas, the apparatus comprising a nozzle having an adjustable cross-section, an adjustable cross-section area, and a central section comprising a cone converging in the direction of flow of liquid saturated with gas into an enclosed area, whereby the liquid diverges downstream of the central section, generating gas bubbles.

6. The apparatus of claim 5 wherein the nozzle defines an annular opening.

7. The apparatus of claim 5 wherein the nozzle has the shape of a Laval nozzle.

8. The apparatus of claim 5 wherein the nozzle defines an axis and the cone is moveable in an axial direction.

9. The apparatus of claim 5 wherein the enclosed area comprises a pulse pipe and a diffuser disposed adjacent the pulse pipe, the pulse pipe having a substantially constant cross-section and the diffuser having a cross-section which increases from the nozzle outwards.

10. The apparatus of claim 5 wherein the nozzle and the cone each define an axis and the cone is moveable along the axis of the nozzle and is rotatable about the axis of the cone.

11. The apparatus of claim 5 wherein the cone defines an axis and is rotatable about said axis.

* * * * *